(12) United States Patent
Sakurai

(10) Patent No.: US 7,537,367 B2
(45) Date of Patent: May 26, 2009

(54) ILLUMINATION DEVICE, IMAGE READING DEVICE, AND IMAGE FORMING APPARATUS

(75) Inventor: Yasuo Sakurai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 401 days.

(21) Appl. No.: 11/345,485

(22) Filed: Feb. 2, 2006

(65) Prior Publication Data

US 2006/0197822 A1    Sep. 7, 2006

(30) Foreign Application Priority Data

Mar. 2, 2005   (JP)   ............... 2005-057541

(51) Int. Cl.
    *G02B 6/00* (2006.01)
    *H01L 33/00* (2006.01)
    *H01J 3/14* (2006.01)

(52) U.S. Cl. .................. 362/551; 362/555; 362/800; 250/216; 250/234

(58) Field of Classification Search ............ 250/216, 250/234; 362/223, 551, 555, 619, 800
See application file for complete search history.

(56) References Cited

U.S. PATENT DOCUMENTS

| | | | |
|---|---|---|---|
| 4,255,042 A | 3/1981 | Armitage, Jr. et al. | |
| 4,344,691 A | 8/1982 | Grant et al. | |
| 6,072,171 A * | 6/2000 | Nakamura et al. | 250/216 |
| 6,379,017 B2 * | 4/2002 | Nakabayashi et al. | 362/619 |
| 2003/0179420 A1 * | 9/2003 | Fujino | 358/484 |
| 2005/0088707 A1 | 4/2005 | Sakurai et al. | |
| 2005/0129436 A1 | 6/2005 | Kohchi et al. | |

FOREIGN PATENT DOCUMENTS

| | | |
|---|---|---|
| JP | 5-46169 | 6/1993 |
| JP | 11-232912 | 8/1999 |
| JP | 2000-48616 | 2/2000 |
| JP | 2001-109084 | 4/2001 |
| JP | 3187280 | 5/2001 |
| JP | 3392117 | 1/2003 |

\* cited by examiner

*Primary Examiner*—Stephen D Meier
*Assistant Examiner*—Alexander C Witkowski
(74) *Attorney, Agent, or Firm*—Oblon, Spivak, McClelland, Maier & Neustadt, P.C.

(57) ABSTRACT

An illumination device that illuminates an original document by propagating an illuminating light beam output from each of a plurality of light emitting diodes from a first end surface of a light guide to a second end surface of the light guide. Assuming that A is a dimension from the first end surface of the light guide to the second end surface of the light guide, B is an interval between adjoining light emitting diodes, the light emitting diodes being arranged in an array format in a main scanning direction, n1 is a refractive index of atmosphere outside of the light guide, and n2 is a refractive index of the light guide, a condition of $\tan^{-1}(B/2A) \leq \beta \leq \pi/2 - \{\sin^{-1}(n1/n2)\}$ is satisfied.

16 Claims, 8 Drawing Sheets

ANGLE OF DIRECTIVITY
FOR TOTAL REFLECTION $\alpha = 90 - \theta = 90 - (\sin^{-1} n_1/n_2)$
$\theta = \sin^{-1} n_1/n_2$

LIGHT INTENSITY DISTRIBUTION
(IN SUB-SCANNING DIRECTION)

ILLUMINATION DEVICE, IMAGE READING DEVICE, AND IMAGE FORMING APPARATUS

CROSS-REFERENCE TO RELATED APPLICATIONS

The present document incorporates by reference the entire contents of Japanese priority document, 2005-057541 filed in Japan on Mar. 2, 2005.

BACKGROUND OF THE INVENTION

1. Field of the Invention

The present invention relates to an illumination device that employs light emitting diodes (LEDs), an image reading device that reads images of an original document by illuminating the original document with the illumination device, and an image forming apparatus incorporating the image reading device and equipped with copying capabilities such as monochromatic copying, full color copying, multi function capabilities, etc.

2. Description of the Related Art

FIG. 9 is a schematic diagram of a conventional image reading device (hereinafter, "scanner") that scans images of an original document. A scanner 200 basically includes a document plate (contact glass plate) 11 on which the original document is placed, a first carriage 3 disposed below the document plate 11 and including a light source 1 and a first mirror 2, a second carriage 6 consisting of a second mirror 4 and a third mirror 5, an imaging lens 7 on which a reflected light from the original document that has been guided through the first mirror 2, the second mirror 4, and the third mirror 5, and a charge-coupled device (CCD, which is an imaging element) 8 that reads and carries out photoelectric conversion of the image formed on the imaging surface by the imaging lens 7. In the conventional scanner 200, when scanning the original document, the second carriage 6 moves at half the scanning speed of the first carriage 3 in the sub-scanning direction.

FIG. 10 is a perspective of an illumination device that uses a xenon lamp as a light source. As shown in FIG. 10, the light source 1 of the first carriage 3 is a cylindrical xenon lamp 9, which is disposed within a housing 13 having an opening 12 towards the contact glass plate 11. The light emitted directly from the xenon lamp 9 is directed towards the contact glass plate 11. Additionally, a reflective plate 10 provided near the exit of the housing 13 also deflects the light emitted from the xenon lamp 9 towards the contact glass plate 11. The first carriage 3 guides the reflected light from the high intensity area to the second mirror 4 and the third mirror 5. When this kind of light source is used, the imaging position is different for each of the colors R, G, and B, as shown in FIG. 11, requiring uniform distribution of light intensity on the surface of the original document enough to cover the difference.

Light emitting diode (LED) is being looked into to serve as a light source (point light source) from the viewpoints of energy saving, quick starting, and reliability. However, the LED, when used alone, has demerits like degradation of light intensity, rippling (unevenness of light intensity) in the main scanning direction, etc., and therefore cannot be used as a light source as it is.

Therefore, the LED is coupled with a light guide. Japanese Patent Laid-Open Publication No. 2000-48616 discloses an illumination device, which is provided with an iris disposed between the light source and the light guide that causes the light beam from the light source to enter the light guide at an angle that is equal to or greater than a critical angle and be directed towards a diffusing unit. In the invention disclosed in Japanese Patent Laid-Open Publication No. 2000-48616, the light guide is a rod-like structure composed of a transparent material whose end surface functions as the entrance surface and at least a portion of whose side surface functions as the exit surface. The iris restricts the light beam entering from the entrance surface such that the beam forms an incidence angle, which is equal to or greater than a critical angle the beam forms with the side surface.

However, in the illumination device disclosed in Japanese Patent Laid-Open Publication No. 2000-48616, the relation between the characteristics of LED and the light guide is not defined.

In other words, as a narrow-directivity LED is used as the light source for scanning an image the LED, a peak occurs in the light distribution pattern as shown in FIG. 12, and the light intensity distribution on the surface of the document across the scanning width is neither uniform nor sufficient. Narrow-directivity LED also gives rise to significant unevenness of light intensity in the main scanning direction, leading to what is known as rippling. An ideal LED would be a wide-directivity LED having an illuminating beam that spreads out in the main scanning direction and casts uniform light intensity across the scanning width in the sub-scanning direction, as shown in FIG. 13.

However, in the wide-directivity LED, when the light guide guides the light emitted from the LED towards the surface of the document, the light rays that come out without being totally reflected escape outside from the light guide, leading to loss of the light and attenuation of the light intensity.

SUMMARY OF THE INVENTION

It is an object of the present invention to at least solve the problems in the conventional technology.

According to an aspect of the present invention, an illumination device that illuminates an original document by propagating an illuminating light beam output from each of a plurality of light emitting diodes from a first end surface of a light guide to a second end surface of the light guide, the illumination device satisfying a condition of $\tan^{-1}(B/2A) \leq \beta \leq \pi/2 - \{\sin^{-1}(n1/n2)\}$, where A is a dimension from the first end surface of the light guide to the second end surface of the light guide, B is an interval between adjoining light emitting diodes, the light emitting diodes being arranged in an array format in a main scanning direction, n1 is a refractive index of atmosphere outside of the light, and n2 is a refractive index of the light guide.

According to another aspect of the present invention, an image reading device includes the illumination device according to the above aspect.

According to another aspect of the present invention, an image forming apparatus includes the image reading device according to the above aspect.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained next with reference to the accompanying drawings.

Figure 1:
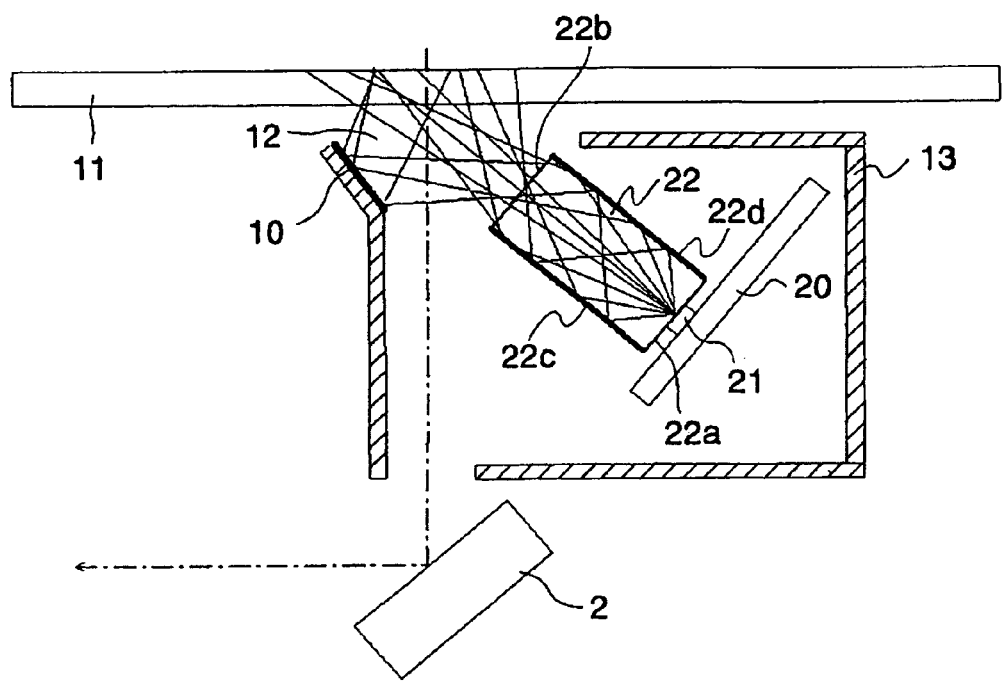
FIG. 1 is a perspective of an illumination device according to an embodiment of the present invention.

FIG. 1 is a perspective of the illumination device according to an embodiment of the present invention. The illumination device includes an LED 21 and a light guide 22. The LED 21 is a wide-directivity type light source. The LED 21 is mounted on a board 20. A first end surface (entrance surface) 22a of the light guide 22 is in contact with the LED 21, and a second end surface (exit surface) 22b points towards the direction of the light (towards the light-receiving surface). The rest of the parts are identical to those shown in FIG. 9 and have been assigned the same reference numerals.

Figure 2:
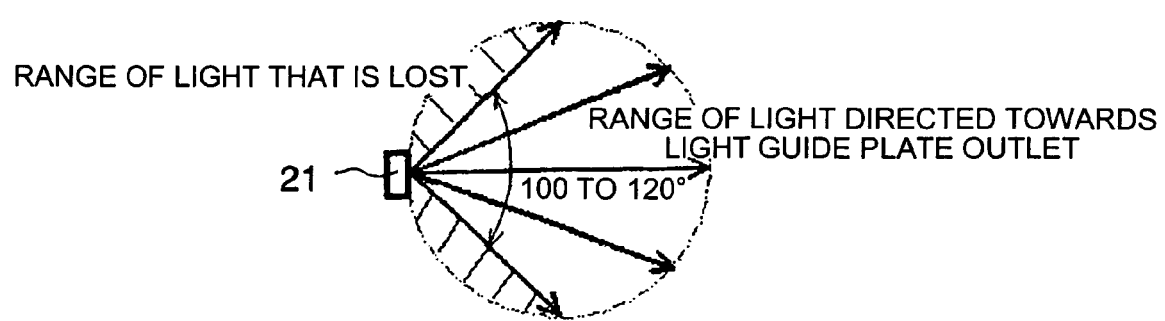
FIG. 2 is a schematic for explaining an emission distribution of a wide-directivity type LED.
Figure 3:
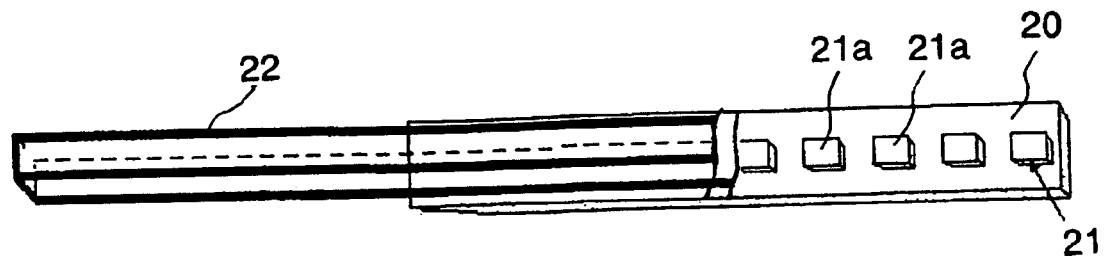
FIG. 3 is a schematic for explaining the relation between the LEDs and a light guide.

FIG. 2 is a schematic for explaining an emission distribution of the LED 21, which is of the wide-directivity type. The range of light emitted from the emission surface of the LED 21 is 100 degrees to 120 degrees, as shown in FIG. 2. FIG. 1 is a cross-sectional drawing illustrating a structure in which the light guide 22 guides the light emitted by the LED 21 shown in FIG. 2 towards the light-receiving surface. FIG. 3 is a schematic for explaining the relation between the LEDs 21 and the light guide 22. As shown in FIG. 3, several LEDs 21 are arranged at regular intervals in an array format. The light guide 22, which is rectangular in cross-section, is disposed along emitting surface 21a of the LED 21, with the exit surface 22b, from which the light emitted by the LED 21 exits, facing the light-receiving surface (the contact glass plate 11).

Figure 4:
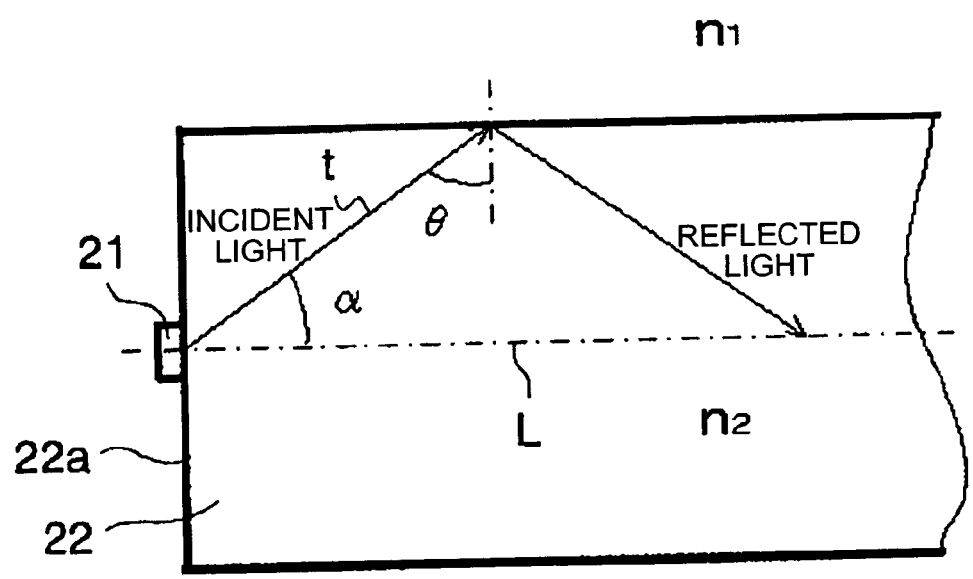
FIG. 4 is a schematic for explaining the relation between an angle of directivity and a critical angle when there is total reflection within the light guide.

When the light in the light guide 22 is propagated inside the light guide 22 towards the atmospheric layer, as shown in FIG. 4, the angle at which the light rays do not escape to the atmosphere is decided by the difference in the refractive indices of the atmosphere and the light guide 22. As the refractive index (n1) of the atmosphere outside of the light guide 22 is 1.0, and the refractive index (n2) of the light guide 22 is approximately 1.52 if the light guide 22 includes an optical glass (crown glass), the angle at which the light rays do not escape to the atmosphere, in other words, the so-called critical angle θ (the angle between the light path and the normal dropped from the point where the light path meets the side surface of the light guide 22 to the side surface of the light guide 22 is given by Expression (1) given below.

$$\theta = \sin^{-1}(n1/n2) \quad (1)$$

The relation between the critical angle θ and an angle of directivity α (the angle between an optical axis L of the LED 21 and a light path t) and of the LED 21 is given by Expression (2) given below.

$$\alpha = \pi/2 - \theta$$

That is, $\alpha = \pi/2 - \{\sin^{-1}(n1/n2)\}$ \quad (2)

If the material of the light guide 22 is optical glass, the critical angle θ would be 41 degrees and the angle of directivity α would be 49 degrees.

Figure 5:
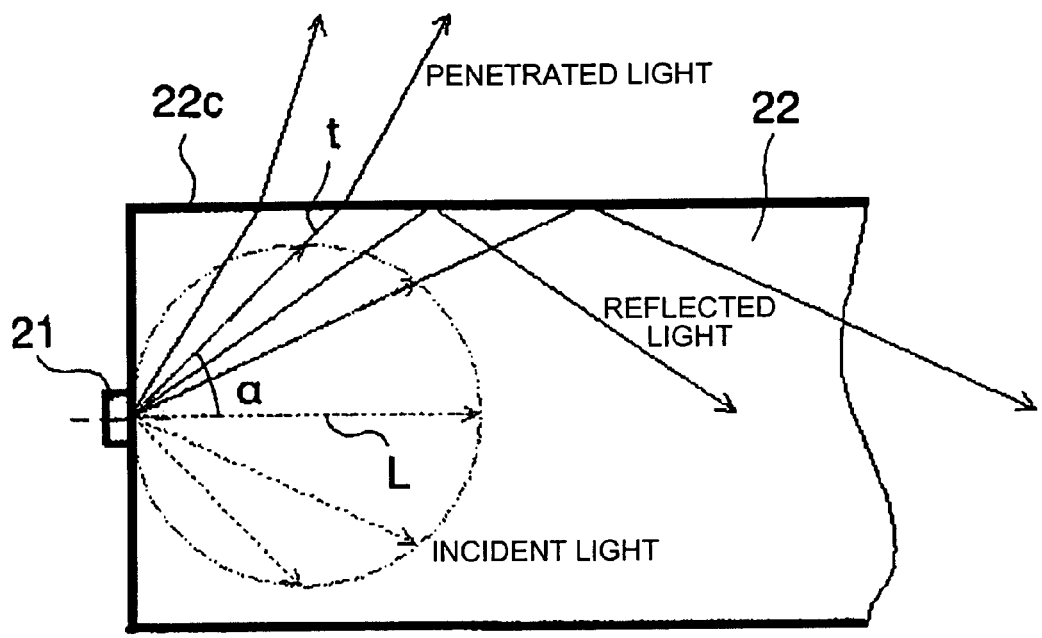
FIG. 5 is a schematic for explaining the angle of directivity when there is penetration of light during total refection within the light guide.

In other words, as shown in FIG. 5, those light rays of the light emitted from the LED 21 that have an angle of directivity (α) that is equal to or less than 49 degrees do not escape outside from the side surface of the light guide 22 and are reflected within the light guide 22. Thus, as shown in FIG. 1, the light is totally reflected within the light guide 22 and propagated above the LED 21 (along the direction forming an angle of directivity (α) of 0 degrees).

In the case of the wide-directivity LED 21 shown in FIG. 2, the light falling in the range of 49 [degrees]×2, that is roughly 100 degrees is propagated to the exit surface 22b of the light guide 22. The light that falls in the remaining 0 degree to 20 degrees range escapes outside from the side surface of the light guide 22. Thus, an amount of light that is equal to or greater than 80% of from the LED 21 ends up being propagated towards the exit surface 22b of the light guide 22 if the light guide 22 is made of optical glass (crown glass).

Figure 6:
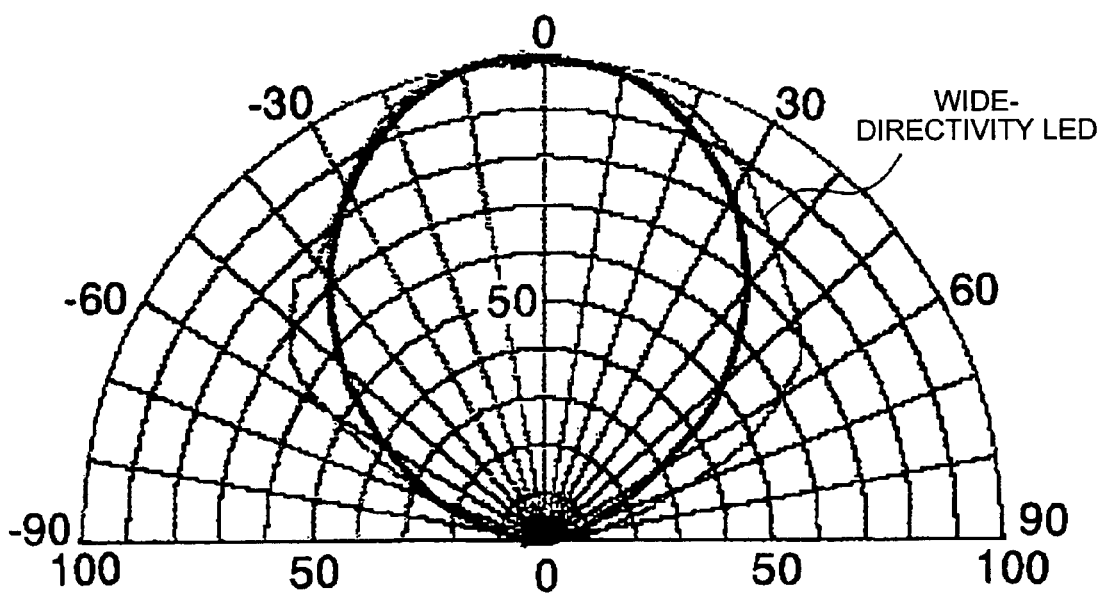
FIG. 6 is a schematic for explaining the relation between the angle of directivity of the wide-directivity LED and a light intensity.

FIG. 6 is a schematic for explaining the relation between the angle of directivity of the wide-directivity LED 21 and the light intensity. In FIG. 6, the inner thick line represents the standard characteristics of a conventional LED, and the outer thin line represents the characteristics of the wide-directivity LED. When the angle of directivity (α) is in the vicinity of 45 degrees, the light intensity is around 0.5 (a relative value obtained by assuming light intensity to be 1.0 when the angle of directivity (α) is 0 degree). A concept of a half-value angle β is introduced for the wide-directivity LED 21 according to the present embodiment. The half-value angle β is the angle of the direction where the light intensity t is half of the maximum light intensity with respect to the direction of the optical axis L.

In other words, if the half-value angle β is smaller than the angle of directivity α that forms the critical angle θ, the illuminating beam emitted by the LED 21 is totally reflected by a side surface 22c of the light guide 22 before being emitted from the exit surface 22b of the light guide 22.

Therefore, the condition for total reflection by the side surface of the light guide 2 is, $$\beta \leq \alpha$$

As the angle of directivity α is determined by Expression (2), the half-value angle β is given by Expression (3) given below.

$$\beta \leq \pi/2 - \{\sin^{-1}(n1/n2)\} \quad (3)$$

Figure 7:
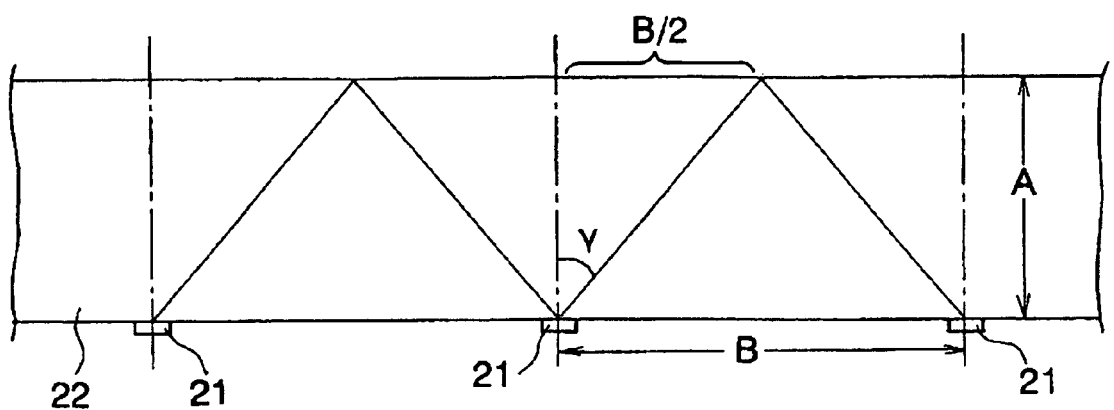
FIG. 7 is a schematic for explaining the relation between an interval between the LEDs, the dimension of the light guide in the main scanning direction, which is also the light emission direction, and the angle of directivity.

FIG. 7 is a schematic for explaining the relation between an interval between the LEDs, the dimension of the light guide in the main scanning direction, which is also the light emission direction, and the angle of directivity. As can be discerned from FIG. 7, if the dimension of, i.e., the distance between, the light guide 22 in the direction of light propagation is A, and the interval, i.e., distance, between adjoining LEDs 21 is B, and assuming at least that the light emitted from the LED 21 is emitted from the entire surface of the exit surface 22b in the main scanning direction as a condition to preclude dark portions (unevenness of light intensity) at the exit surface 22b of the light guide 22, the relation between the aforementioned dimensions and an angle of directivity γ is given by, $$\tan \gamma = (B/2)/A$$

and γ is given by, $$\gamma = \tan^{-1}(B/2A)$$

Unevenness of light intensity occurs of the half-value angle β is smaller than the angle of directivity γ. Therefore, to preclude unevenness of light intensity the following condition must be met.

$$\beta \geq \gamma$$

As γ is $\tan^{-1}(B/2A)$, β can be expressed as, $$\beta \geq \tan^{-1}(B/2A) \quad (4)$$

Therefore, from Expression (3) and Expression (4), the following derivation can be made.

$$\tan^{-1}(B/2A) \leq \beta \leq 2 - \{\sin^{-1}(n1/n2)\} \quad (5)$$

Thus, when the half-value angle β of the LED 21 being employed and the refractive index n2 of the light guide 22 are known, and the refractive index n1 of the atmosphere is a known entity, that is, 1.0, the dimension of the light guide 22 and the interval between the LEDs 21 in the main scanning direction can be set so that substantially 80% of the light emitted from the LED 21 can be effectively used as the illuminating light. In Expression (4), β is given in radians. However, it can be easily converted to degrees.

From Expression (5), it can be discerned the critical angle θ becomes smaller resulting in increase in the half-value angle β, as the refractive index of the light guide 22 becomes larger. Therefore, the illumination efficiency can be enhanced by employing the light guide 22 made of a material having a large refractive index. Optical glass is the material of choice for the light guide 22. An optical glass has a homogeneous refractive index and thus is devoid of striae. The optical glass used for the light guide 22 is usually crown glass (with a refractive index of 1.5168) known as BK7, flint glass (with a refractive index of 1.6200) known as F2, or heavy flint glass (with a refractive index of 1.7174) known as SF1.

Material used for optical lens, such as acryl resin or polycarbonate resin, which is a transparent resin (having a transmission rate that is equal to or greater than 92%) may also be used as the material for the light guide 22. These resin substances have a refractive index of 1.58 to 1.59 and have characteristics that are midway between those of crown glass and flint glass.

To further increase the illumination efficiency, a reflecting unit such as a diffuse reflective plate (white plate, etc.) may be placed on the side surfaces 22c and 22d of the light guide 22, so that the light emitted from the LED 21 does not escape to the outside from the light guide 22.

Figure 8:
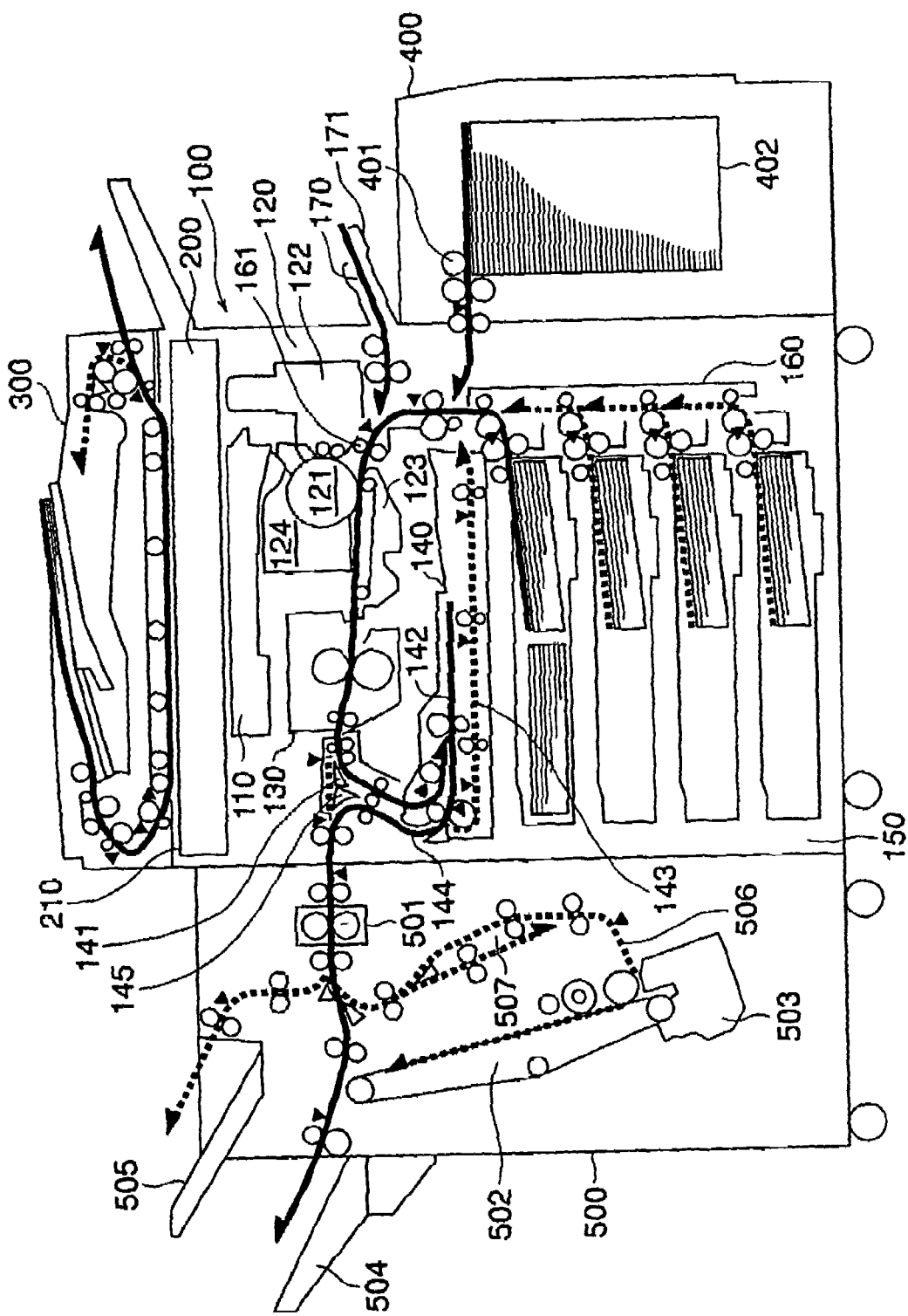
FIG. 8 is a perspective of a system as a whole that includes an image forming apparatus according to the present invention.

FIG. 8 is a perspective of a system as a whole that includes an image forming apparatus according to the present embodiment. As shown in FIG. 8, the system basically includes an image forming apparatus main unit 100, the scanner 200 disposed above the image forming apparatus main unit 100, an automatic document feeder (hereinafter, "ADF") 300 disposed above the scanner 200, a large-capacity paper feeding device 400 disposed to the right of the image forming apparatus main unit 100 in FIG. 8, and a sheet finisher 500 disposed to the left of the image forming apparatus main unit 100 in FIG. 8.

The image forming apparatus main unit 100 includes an image writer 110, an image forming member 120, a fixing member 130, a reverse side transporting member 140, a paper feeder 150, a vertical transporting member 160, and a manual paper feeder 170.

The image writer 110 adjusts the light source LED based on the reading of the image data on the original document by the scanner 200 and carries out laser writing on a photosensitive drum 121 by scanning optical system consisting of polygonal mirror, fθ lens, etc. The image forming member 120 includes image-forming elements known in electrophotographic method, such as the photosensitive drum 121, a developing unit 122, a transfer unit 123, a cleaning unit 124, and a quenching unit, with the developing unit 122, the transfer unit 123, the cleaning unit 124, and the quenching unit disposed along the outer periphery of the photosensitive drum 121.

The fixing unit 120 fixes the image transferred by the transfer unit 123 to the recording paper. The reverse-side transporting member 140 is located downstream of the fixing member 120 in the sheet transport direction, and includes a first switching pawl 141, a reverse transport path 142 to which the recording paper is guided by the first switching pawl 141, an image forming side transport path 143, and a sheet finisher side transport path 144. The first switching pawl 141 switches the sheet transport direction towards the sheet finisher 500 or towards the reverse-side transporting member 140. The image forming side transport path 143 transports the recording paper reversed by the reverse transport path 142 again towards the transfer unit 123. The sheet finisher side transport path 144 transports the reversed recording paper towards the sheet finisher 500. A second switching pawl 145 is located the image forming side transport path 143 and the sheet finisher side transport path 144 branch out.

The paper feeder 150 is four-tiered, the recording paper of the selected tier being drawn and guided to the vertical transporting member 160 by pick-up rollers and feeding rollers of the tier. The vertical transporting member 160 carries the recording paper fed from the any of the tiers of the paper feeder up to a pair of resist rollers 161 located just before the transfer unit 123 upstream in the sheet transport direction. The resist rollers 161 feed the recording paper to the transfer unit 123, timing it so that the recording paper is presented at the transfer unit 123 when the leading end of the latent image on the photosensitive drum 121 approaches the recording paper. The manual paper feeder 170 includes a manual tray 171, which can be opened or closed whenever required for manually feeding the recording paper. In this case too, the resist rollers 161 feed the recording paper to the transfer unit 123, timing it so that recording paper is presented at the transfer unit when the leading end of the latent image on the photosensitive drum 121 approaches the recording paper.

The large-capacity paper feeding device 400 can stack a large volume of recording paper of identical size. As the number of sheets of recording paper dwindles in the large-capacity paper feeding device 400, a base rack 402 shifts upward little by little so that a pick-up roller 401 can access the stack to draw a sheet therefrom. The vertical transporting member 160 transports the recording paper fed by the pick-up roller 401 up to a nip region of the resist rollers 161.

The sheet finisher 500 carries out post-processing such as punching, aligning, stapling, separating, etc. In the present embodiment, the sheet finisher 500 is equipped with a punch unit 501, a stapling tray (for aligning the recording papers) 502, a stapler 503, and a shift tray 504. In other words, the sheets of recording paper transported from the image forming apparatus main unit 100 to the sheet finisher 500 are to be punched, the punch unit 501 punches the recording paper one at a time, and if the recording paper is not marked for any processing, it is ejected to a proof tray 505. Otherwise, the punched sheets of recording paper are ejected to the shift tray 504 for further processing such as sorting, stacking, separating, etc. Separating a preceding set of sheets from the following set of sheets is carried out in the present embodiment by shifting the shift tray 504 by a predetermined amount in the direction perpendicular to the sheet transport direction. A method involving shifting the sheet in the direction perpendicular to the sheet transport direction in the sheet transport path may also used for separating sets of sheets.

For aligning, the sheets of recording paper, either punched or unpunched, are guided to a lower transport path 506 and therefrom to the shift tray 504, the rear edge of which aligns the sheets in the direction perpendicular to the sheet transport direction. A pair of jogger fences in the shift tray 504 aligns the sheets in the direction parallel to the sheet transport direction. Once the sheets are aligned, if the sheets are to be stapled together, the stapler 503 staples the sheets at a designated place, for example, at the upper left corner or two places at the center of the left edge. The stapled set of sheets is then ejected to the shift tray 504. Further, in the present invention, a prestack transport path 507 is provided in the lower transport path 506 which stacks several sheets of recording paper while they are being transported, so that image forming operation of the image forming apparatus main unit 100 does not have to be halted for sheet finishing process.

Figure 9:
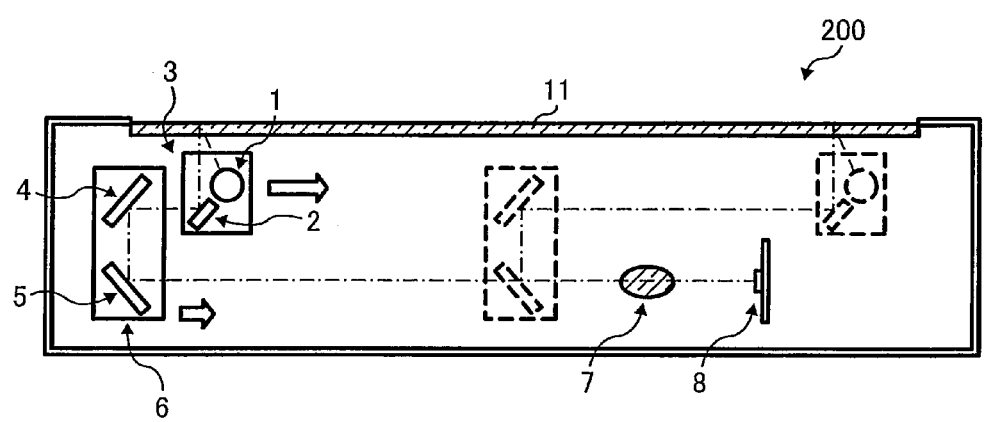
FIG. 9 is a perspective of a conventional image reading device that scans images of an original document.
Figure 10:
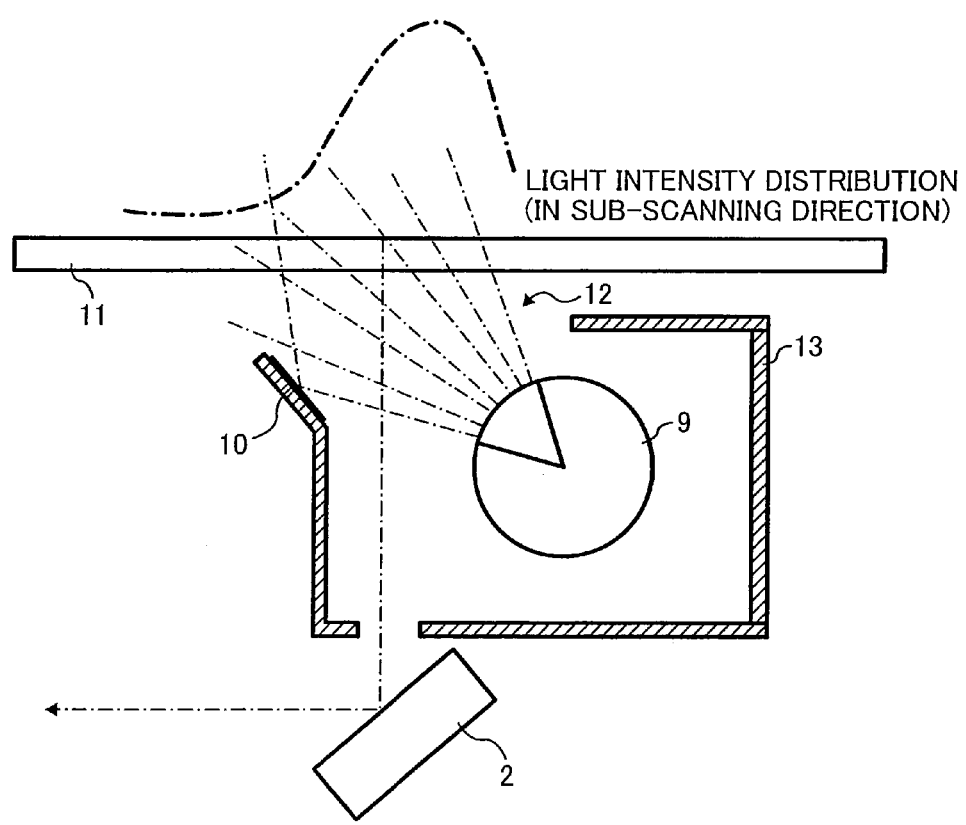
FIG. 10 is a perspective of an illumination device that uses a xenon lamp as a light source.
Figure 11:
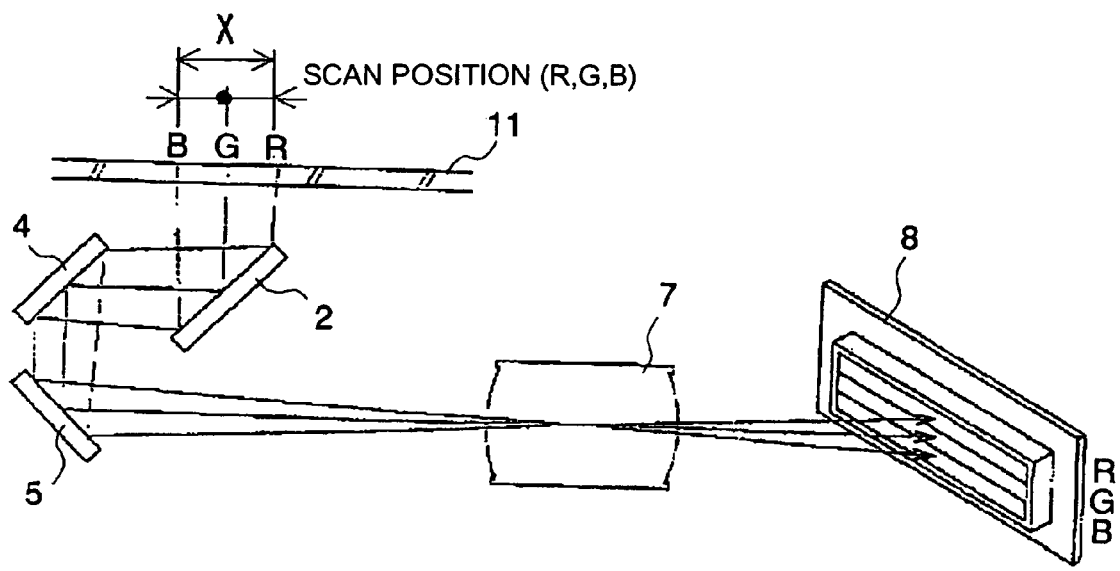
FIG. 11 is a schematic for explaining a relation between a light distribution on the original document and a scanning width of a CCD.
Figure 12:
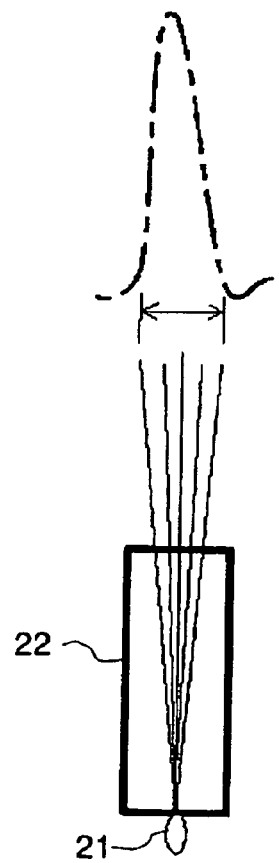
FIG. 12 is a schematic for explaining light distribution characteristics when a narrow-directivity LED is coupled with the light guide.
Figure 13:
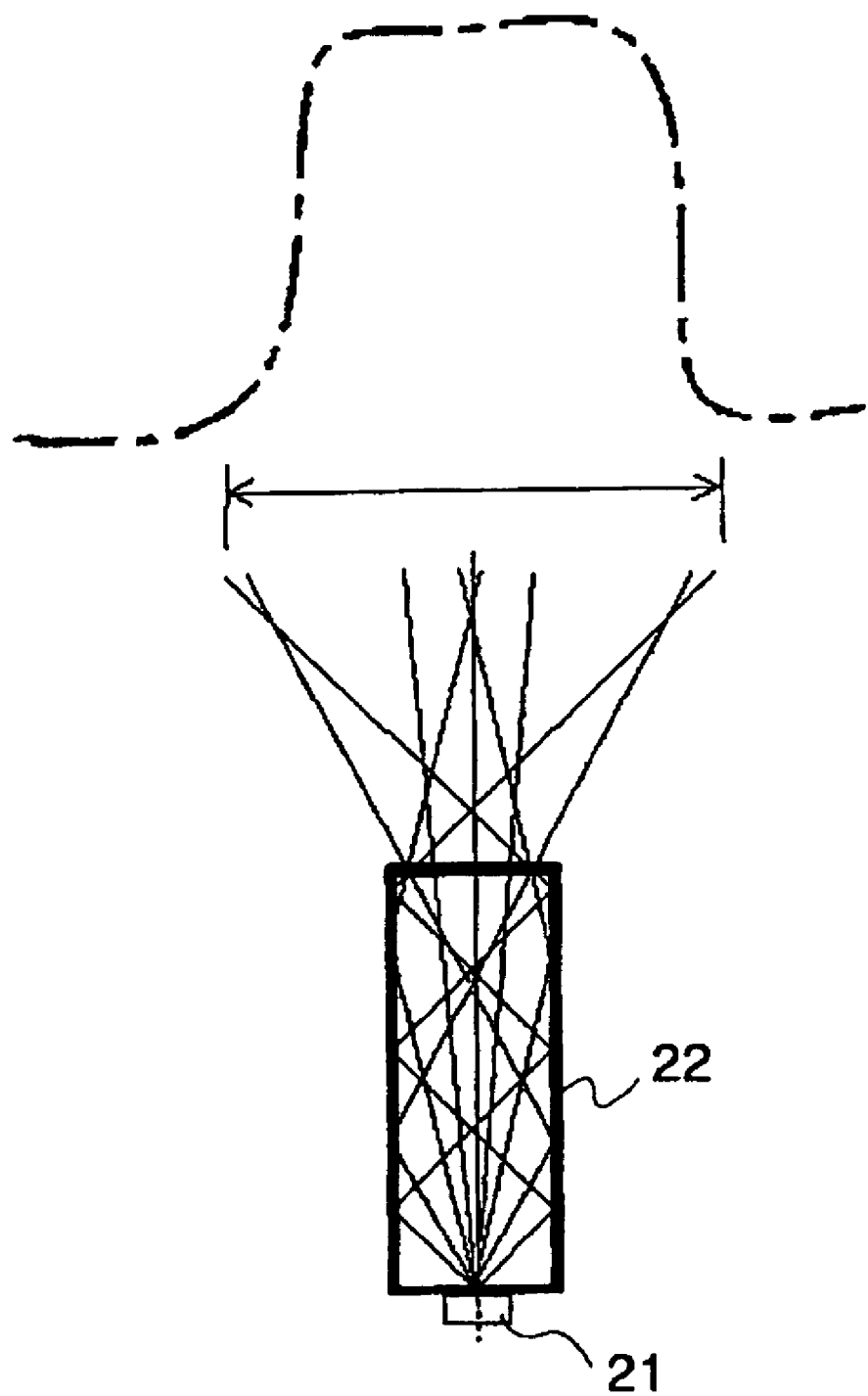
FIG. 13 is a schematic for explaining light distribution characteristics when the wide-directivity LED is coupled with the light guide.

The scanner 200 has the same structure as that shown in FIG. 9. However, the scanner 200 according to the present invention is equipped with the illumination device shown in FIG. 1. The scanner optically scans the original document that is guided to and placed on a contact glass plate 210 by the ADF 300. The imaging lens 7 forms a scanned image by the first mirror 2, the second mirror 4, and the third mirror 5. The scanned image is read by a photoelectric element such as the CCD 8 or a Complementary Metal Oxide Semiconductor (CMOS). The image data that is read is subjected to a designated image processing in a not shown image processing circuit and is held in a storage device. During image formation, the image data is read from the storage device by the image writer 110. The image data is optically written by adjusting the amount of light in the aforementioned manner in response to the image data.

The ADF 300 includes a reverse-side scanning function and is mounted on an installation surface of the contact glass plate 210. The ADF 300 can be opened or closed manually.

Thus, the following effects are realized according to the present embodiment.

(1) As the relation between the half value angle β, which is a characteristic of the LED, the refractive index, which is the characteristic of the light guide, and the dimensions of the light guide is defined by Expression (5), an illumination device having a good illumination efficiency can be provided.

(2) By providing an illumination device that satisfies Expression (5), an amount of light that is equal to or greater than 80% of can be directed towards the document surface. Consequently, uniform light intensity distribution can be obtained.

(3) Using transparent resin, used for making optical lenses, in light guide 22 produces a more effective light source at low cost.

(4) High illumination efficiency translates to energy-saving.

According to the embodiments, a wide-directivity LED having a half-value angle that satisfies the aforementioned relation is used. Consequently when the LED is used coupled with a light guide, the amount of light from the LED can be used to the maximum possible extent and a uniform light intensity distribution pattern can be obtained.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An illumination device for illuminating a document, comprising:
    a plurality of light emitting diodes arranged at a predetermined interval in a predetermined direction; and
    a light guide that guides light beams emitted from the plurality of light emitting diodes, from a first end surface thereof to a second end surface thereof, emitting surfaces of the plurality of light emitting diodes facing the first end surface of the light guide,
    wherein an illumination distribution at the second end surface of the light guide is uniform in the predetermined direction, and
    wherein the light beams emitted from the plurality of light emitting diodes are totally reflected on every surface of the light guide except for the first and second end surfaces thereof.

2. The illumination device according to claim 1, wherein the illumination device satisfies a condition of $\tan-1(B/2A) \leq \beta \leq \pi/2 - \{\sin-1(n1/n2)\}$, where β is an angle of direction where light intensity Is half of a maximum light intensity, A is a dimension from the first end surface of the light guide to the second end surface of the light guide, B is an interval between adjoining light emitting diodes, the light emitting diodes being arranged in an array format in a main scanning direction, n1 is a refractive index of atmosphere outside of the light, and n2 is a refractive index of the light guide, wherein
    the predetermined interval is longer than a distance between the first end surface and the second end surface.

3. The illumination device according to claim 1, wherein the light guide includes an optical glass.

4. The illumination device according to claim 2, wherein the light guide includes an optical glass.

5. The illumination device according to claim 1, wherein the light guide includes a transparent resin with a large refractive index.

6. The illumination device according to claim 2, wherein the light guide includes a transparent resin with a large refractive index.

7. The illumination device according to claim 1, further comprising:
    a light reflecting unit provided on a surface of the light guide that reflects the light beam from the light emitting diode.

8. The illumination device according to claim 2, further comprising:
    a light reflecting unit provided on a surface of the light guide that reflects the light beam from the light emitting diode.

9. The illumination device according to claim 1, wherein the light emitting diode is of a wide-directivity type.

10. The illumination device according to claim 2, wherein the light emitting diode is of a wide-directivity type.

11. The illumination device according to claim 1, wherein the first end surface is opposite to the second end surface.

12. The illumination device according to claim 2, wherein the first end surface is opposite to the second end surface.

13. An image reading device comprising an illumination device according to claim 1.

14. An image reading device comprising an illumination device according to claim 2.

15. An image forming apparatus comprising the image reading device according to claim 13.

16. An image forming apparatus comprising the image reading device according to claim 14.

* * * * *